United States Patent [19]

Büscher et al.

[11] Patent Number: 5,628,535
[45] Date of Patent: May 13, 1997

[54] MOTOR ACTUATOR FOR CENTRALLY OPERATED VEHICULAR DOOR LATCH

[75] Inventors: Hans-Joachim Büscher, Düsseldorf, Germany; Dennis D. Schwaiger, Whitmore Lake, Mich.

[73] Assignee: Kiekert AG, Heiligenhaus, Germany

[21] Appl. No.: 615,742

[22] Filed: Mar. 14, 1996

[30] Foreign Application Priority Data

May 3, 1995 [DE] Germany .................... 19516162

[51] Int. Cl.$^6$ .................................................. E05C 3/06
[52] U.S. Cl. ..................... 292/201; 292/199; 292/144; 292/DIG. 23
[58] Field of Search .................. 292/144, 199, 292/201, DIG. 23

[56] References Cited

U.S. PATENT DOCUMENTS

| | | | |
|---|---|---|---|
| 3,989,286 | 11/1976 | Cleff | 292/201 X |
| 4,135,377 | 1/1979 | Kleefeldt et al. | 292/201 X |
| 4,257,634 | 3/1981 | Kleefeldt et al. | 292/201 X |
| 4,364,249 | 12/1982 | Kleefeldt | 292/201 X |
| 4,821,521 | 4/1989 | Schuler | 292/201 X |
| 4,932,690 | 6/1990 | Kleefeldt et al. | 292/201 X |
| 5,079,964 | 1/1992 | Hamada et al. | 292/201 X |
| 5,419,597 | 5/1995 | Brackmann et al. | 292/201 |
| 5,441,315 | 8/1995 | Kleefeldt et al. | 292/201 |
| 5,472,065 | 12/1995 | Vergin | 292/201 X |

*Primary Examiner*—Rodney M. Lindsey
*Assistant Examiner*—Monica E. Millner
*Attorney, Agent, or Firm*—Herbert Dubno; Andrew Wilford

[57] ABSTRACT

A power actuator is used with a door latch having a threaded spindle, a nut axially displaceable by the spindle, and a coupling element connected to the nut and displaceable thereby to lock and unlock the latch. The actuator has a reversible electric motor having an output shaft defining a main axis and rotatable in either direction thereabout, an input wheel fixed on the shaft and provided with an eccentric coupling pin, and an intermediate wheel rotatable about the main axis and provided with an eccentric pivot. An output wheel rotatable about the main axis has a gear meshing with a gear of the threaded spindle and is provided with a pair of angularly offset abutments defining an orbit on rotation of the output wheel. A coupling element mounted on the intermediate-wheel pivot is provided with respective angularly offset coupling formations engageable with the output-wheel abutments and has a formation angularly engaging the input-wheel coupling pin. A spring urges the coupling element into a position with the coupling formations inside the orbit and the input wheel decoupled from the output wheel. The coupling element is movable angularly against the force of the spring about the eccentric pivot on rotation of the input wheel to end coupling positions in each of which a respective one of the coupling formations engages the respective abutment and couples the input wheel to the output wheel for joint rotation about the axis.

7 Claims, 4 Drawing Sheets

MOTOR ACTUATOR FOR CENTRALLY OPERATED VEHICULAR DOOR LATCH

FIELD OF THE INVENTION

The present invention relates to a motor-vehicle door latch. More particularly this invention concerns an electric-motor actuator for such a latch forming part of a central lock system of a motor vehicle.

BACKGROUND OF THE INVENTION

A standard central motor-vehicle lock system has a plurality of door latches on the individual doors, hatches, trunk lids, and the like that are each operable by a respective power actuator and also by a manual mechanism. The power actuator can include a hydraulic, pneumatic, or electric motor, and the manual mechanism is almost always a lever linkage.

In a standard system such as described in U.S. Pat. No. 4,342,209 each door latch has a locking lever displaceable between a pair of end positions corresponding to locked and unlocked conditions of the respective door. This lever is connected on the one side via a rod to the inside unlocking button in the case of a door and on the other side via another rod to the power actuator which is mounted in the door at some remove from the latch. Thus either the knob or the actuator can be operated to lock or unlock the door.

As described in commonly owned U.S. Pat. No. 5,056,343 issued 15 Oct. 1991 the actuator for such a lock system has an electric motor whose output shaft carries a drive pinion that is in continuous mesh with a larger-diameter input gear carried on a threaded spindle in turn carrying a nut. This nut is coupled via a system of deflectable arms to the actuating element. Thus the latch can be moved manually or by the motor between the locked and unlocked position. When moved manually from the locked to the unlocked position, it is necessary for the motor to be operated to move the nut back into the corresponding position before motor-powered operation can resume.

Commonly owned U.S. Pat. Nos. 5,149,156 and 5,441,315 describe a system wherein a support pivotal in the housing carries a pair of coupling gears in mesh with and flanking the output gear of the motor actuator. The support is rockable from a central position in which neither of the coupling gears meshes with the input gear into a pair of end positions in each of which a respective one of the coupling gears meshes with the input gear and couples same to the output gear. The support is biased into the central position with a relatively small force such that on rotation of the input gear in either direction the biasing force is overcome and the support is rocked in the same direction into the respective end position.

With this system, therefore, there is no need to reverse drive the motor so the link parts can reassume the proper position if after power actuation the door lock is operated manually. The power actuator can pick up right where it left off. Such a system requires that two extra gears be built into the system and a housing including journals for them be provided.

OBJECTS OF THE INVENTION

It is therefore an object of the present invention to provide an improved door-latch actuator of the above-described general type.

Another object is the provision of such an improved door-latch actuator of the above-described general type which overcomes the above-given disadvantages, that is which is substantially simpler than the prior-art systems, but which otherwise has all the desirable characteristics of them.

SUMMARY OF THE INVENTION

The instant invention is a power actuator used in combination with a door latch having a threaded spindle, a nut threaded on the spindle and axially displaceable thereby on rotation of the spindle, an input gear carried on and rotatable with the threaded spindle, and a coupling element connected to the nut and displaceable thereby to lock and unlock the latch. The actuator has according to the invention a reversible electric motor having an output shaft defining a main axis and rotatable by the motor in either direction thereabout, an input wheel fixed on the motor shaft and provided with an eccentric coupling pin, and an intermediate wheel juxtaposed with the input wheel, rotatable relative thereto about the main axis, and provided with an eccentric pivot. An output wheel rotatable about the main axis has a gear continuously meshing with the gear of the threaded spindle and is provided with a pair of angularly offset abutments defining an orbit on rotation of the output wheel about the main axis. A coupling element mounted on the intermediate-wheel pivot is provided with respective angularly offset coupling formations engageable with the output-wheel abutments and has a formation angularly engaging the input-wheel coupling pin. A spring urges the coupling element into a rest position with the coupling formations inside the orbit and the input wheel decoupled from the output wheel. The coupling element is movable angularly against the force of the spring about the eccentric pivot on rotation of the input wheel relative to the intermediate wheel to end coupling positions in each of which a respective one of the coupling formations engages the respective abutment and couples the input wheel to the output wheel for joint rotation about the axis. The spring force is such that the torque necessary to pivot the coupling element on the output wheel is less than the torque necessary to rotate the output wheel.

This assembly is extremely compact and simple. Nonetheless it ensures that as soon as the motor is energized it will couple the input wheel to the output wheel and drive the spindle in either direction by means of the motor. When the motor is deenergized the spring returns the parts to the rest position and thereby decouples the output wheel from the rest of the mechanism, allowing the latch to be locked and unlocked manually.

The spring has one end fixed on the intermediate wheel and a pair of arms extending generally diametrally to and embracing the coupling pin. In addition the intermediate wheel has an eccentric pin between and angularly engaged by the spring arms. The coupling element is formed with an abutment edge for the arms of the spring.

In accordance with another feature of the invention the input wheel has a hub extending along the shaft and the intermediate wheel is rotatable about the axis on the shaft. The coupling-element formation is a notch engaged around the coupling pin.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
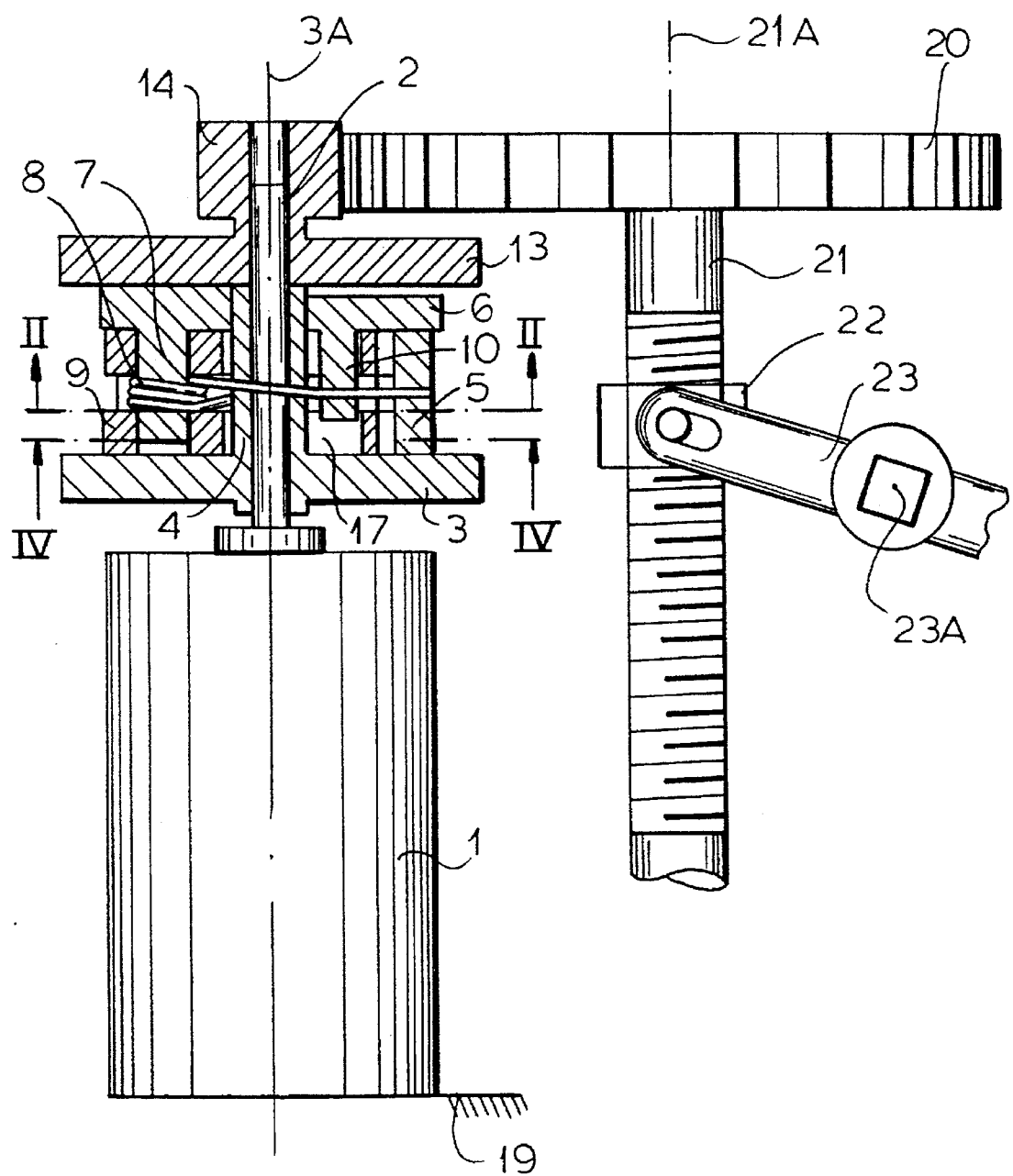
FIG. 1 is a side view partly in section through a door latch and actuator according to the invention.

As seen in FIG. 1 a motor-vehicle door latch has a housing illustrated schematically at 19 in which is mounted a reversible electric motor 1 having an output shaft 2 couplable as will be described below to an output gear 14 continuously meshing with an input gear 20 carried on a spindle 21 rotatable in the housing 19 about a spindle axis 21A. A nut 22 threaded on the spindle 21 is coupled to an arm 23 pivotal about an axis 23A and serving to displace the latch between the locked and unlocked positions as described in the above-cited US patents.

Figure 2:
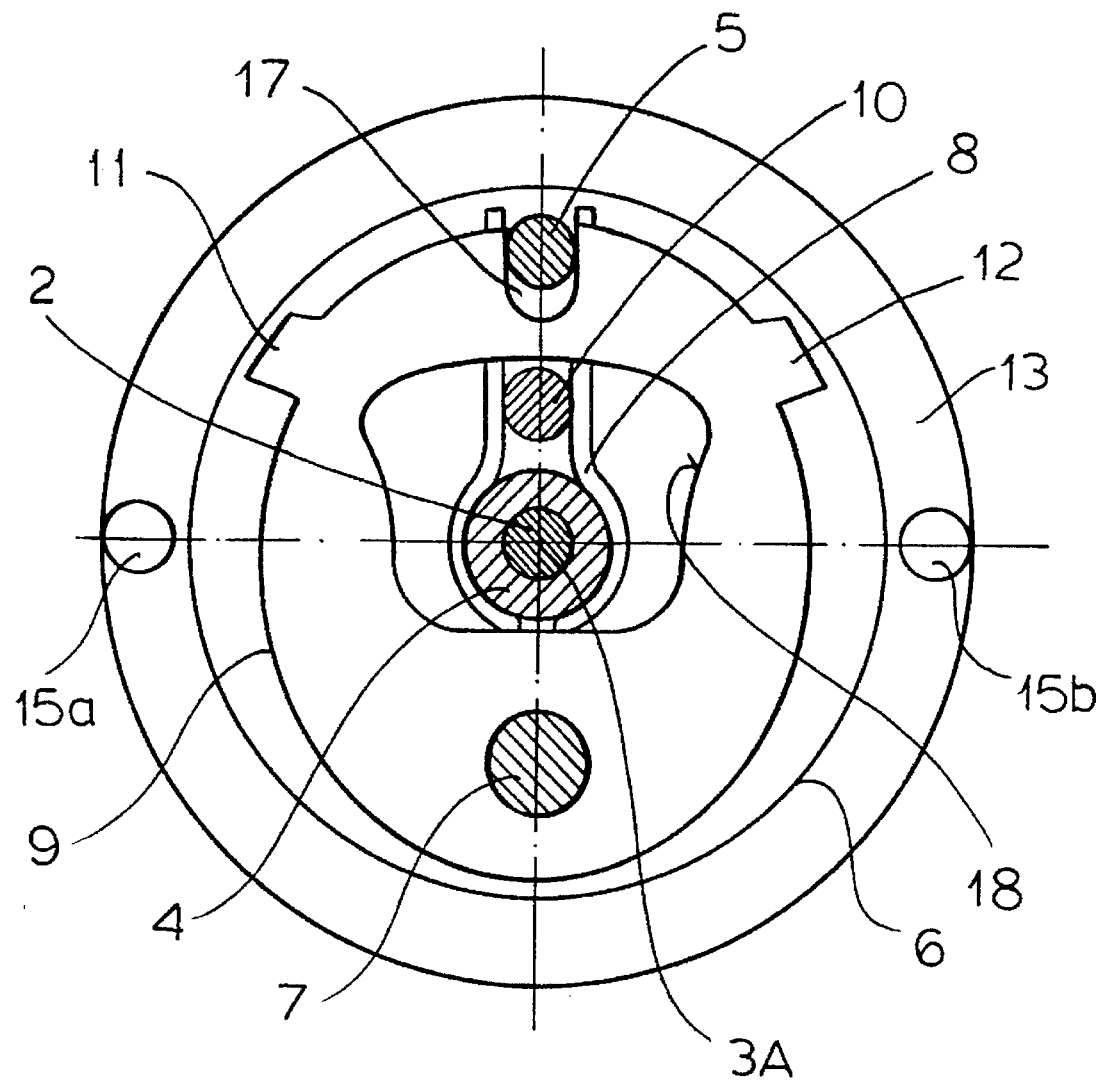
FIG. 2 is a section through the actuator taken along line II—II of FIG. 1 in the rest position.

According to the invention an input wheel 3 is fixed on this shaft 2 to rotate about a central axis 3A. The wheel 3 has a hub 4 extending along the shaft 2 and is formed offset from the hub 4 with an axially outwardly projecting coupling pin 5 that orbits about the axis 3A as the motor 1 rotates the shaft 2. An intermediate wheel 6 is rotatable about the axis 3A on the hub 4 and itself is provided with two diametrally opposite eccentric pins 7 and 10 projecting axially inward toward the wheel 3. A hairpin-type return spring 8 has a base loop engaged around the pin 7 and two arms extending diametrally across the coupling, embracing the hub 4, and engaging on both sides of the pins 10 and 5 as shown in FIG. 2. Thus unless outside forces are brought to bear, the spring 8 will keep the pins 5, 7, and 10 in line on a diameter through the axis 3A as shown in FIG. 2 in what is the rest position of the coupling.

A coupling element 9 is pivoted on the mounting pin 7 and is formed with a central window 18 through which the hub 4 and pin 10 engage and a radially outwardly open notch or cutout 17 engaged around the pin 5. The element 9 is formed with a pair of outwardly projecting noses 11 and 12 engageable with coupling pins 15a and 15b formed on an output wheel 13 unitary with the gear 14 and rotatable on the shaft 2. When the parts are in the rest position of FIG. 2 the noses 11 and 12 lie radially inside the orbits of the pins 15a and 15b so that the wheel 13 and gear 14 can rotate freely on the shaft 2 relative to the wheel 3 and element 9.

Figure 3:
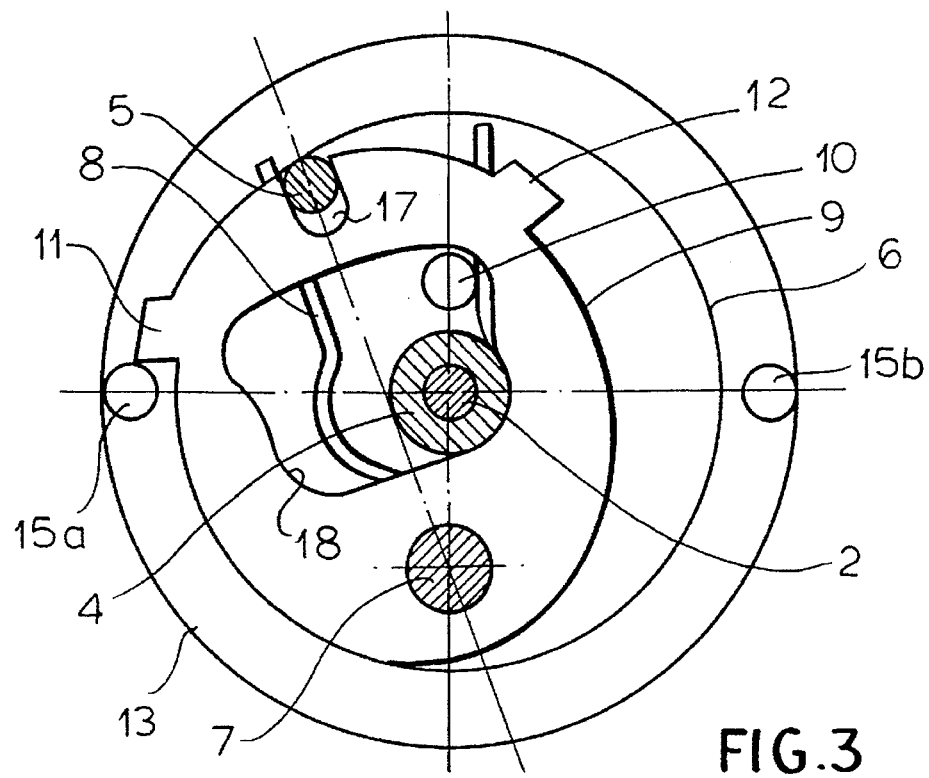
FIG. 3 is a view like FIG. 2 but with the drive in an actuated position.
Figure 4:
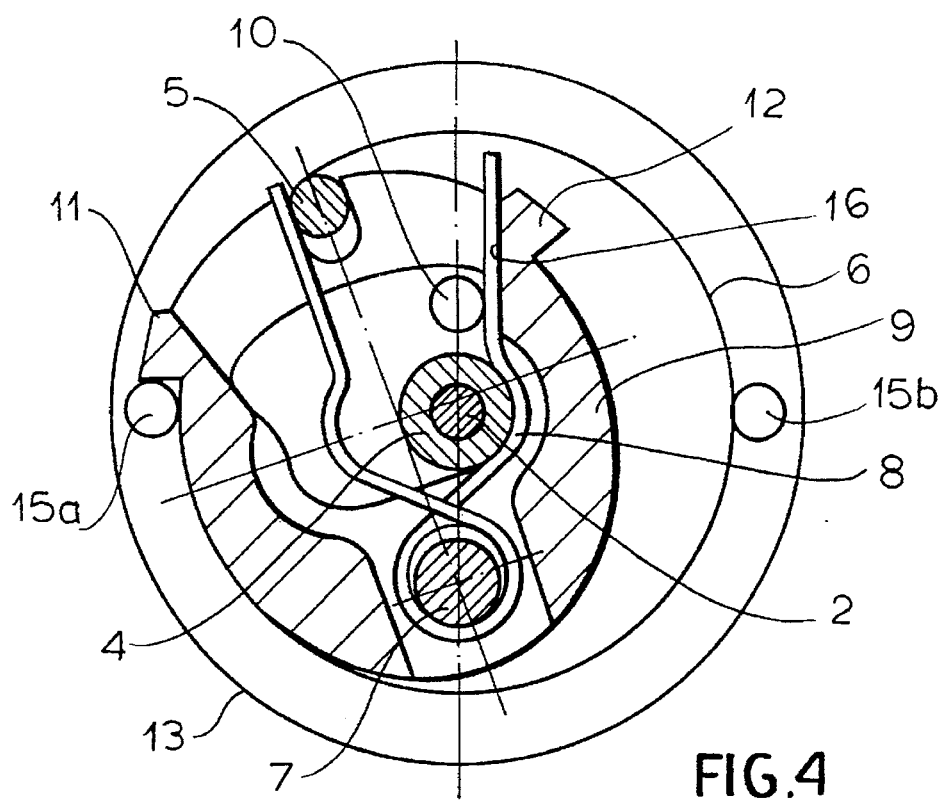
FIG. 4 is a section taken along line IV—IV of FIG. 1 but showing the drive in the actuated position.
Figure 5:
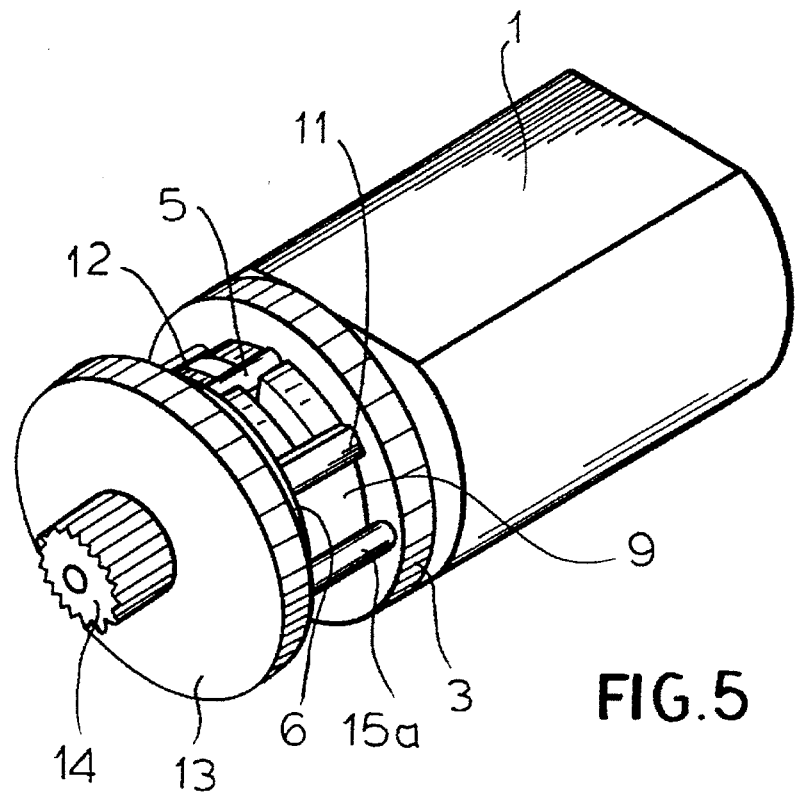
FIGS. 5 and 6 are small-scale perspective views taken from different sides of the drive according to the invention.
Figure 6:
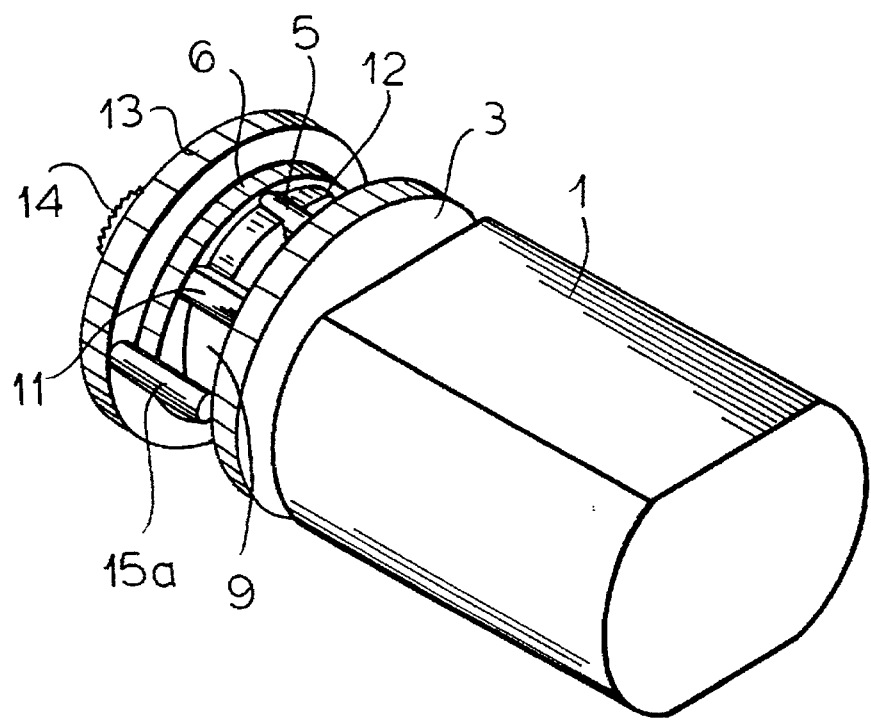

When, however, the motor 1 rotates, for instance in the counterclockwise direction as shown in FIGS. 3 and 4, the pin 5 will start to orbit counterclockwise and will pull the coupling plate 9 to the side until its nose 11 engages the pin 15a and the spring 8 engages a surface 16 of the element 9, coupling the shaft 2 solidly to the output wheel 13 and thereby rotating the spindle 21. To ensure this operation the wheel 6 is substantially more massive than the coupling element 9 or is braked. As soon as the motor 1 stops, however, the spring 8 will bring the pins 5, 10, and 7 back into alignment, decoupling the motor 1 from the gear 14 and allowing it to be rotated manually. This decoupling takes place when the force or torque that is applied is less than the force of the spring 8.

We claim:

1. In combination with a door latch having a threaded spindle;

a nut threaded on the spindle and axially displaceable thereby on rotation of the spindle;

an input gear carried on and rotatable with the threaded spindle; and a coupling element connected to the nut and displaceable thereby to lock and unlock the latch, a power actuator comprising:

a reversible electric motor having an output shaft defining a main axis and rotatable by the motor in either direction thereabout;

an input wheel fixed on the output shaft and provided with an eccentric coupling pin;

an intermediate wheel juxtaposed with the input wheel, rotatable relative thereto about the main axis, and provided with an eccentric pivot;

an output wheel rotatable about the main axis, having a gear continuously meshing with the input gear of the threaded spindle, and provided with a pair of angularly offset abutments defining an orbit on rotation of the output wheel about the main axis;

a coupling element mounted on the intermediate-wheel pivot, provided with respective angularly offset coupling formations engageable with the output-wheel abutments, and having a formation angularly engaging the input-wheel coupling pin; and means including a spring for urging the coupling element into a rest position with the coupling formations inside the orbit and the input wheel decoupled from the output wheel, the coupling element being movable angularly against a force of the spring about the eccentric pivot on rotation of the input wheel relative to the intermediate wheel to end coupling positions in each of which a respective one of the coupling formations engages the respective abutment and couples the input wheel to the output wheel for joint rotation about the axis.

2. The door-latch power actuator defined in claim 1 wherein the spring has one end fixed on the intermediate wheel and a pair of arms extending generally diametrally to and embracing the coupling pin.

3. The door-latch power actuator defined in claim 2 wherein the intermediate wheel has an eccentric pin between and angularly engaged by the spring arms.

4. The door-latch power actuator defined in claim 2 wherein the coupling element is formed with an abutment edge for the arms of the spring.

5. The door-latch power actuator defined in claim 1 wherein the input wheel has a hub extending along the shaft and the intermediate wheel is rotatable about the axis on the shaft.

6. The door-latch power actuator defined in claim 1 wherein the coupling-element formation is a notch engaged around the coupling pin.

7. The door-latch power actuator defined in claim 1 wherein a torque necessary to overcome the spring force and pivot the coupling element on the output wheel is less than a torque necessary to rotate the output wheel.

\* \* \* \* \*